United States Patent
Yaldo

(10) Patent No.: US 11,241,980 B2
(45) Date of Patent: Feb. 8, 2022

(54) VEHICLE SEAT POSITIONING SYSTEM AND METHOD

(71) Applicant: GM GLOBAL TECHNOLOGY OPERATIONS LLC, Detroit, MI (US)

(72) Inventor: Valor Yaldo, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 228 days.

(21) Appl. No.: 16/407,625

(22) Filed: May 9, 2019

(65) Prior Publication Data

US 2020/0353844 A1  Nov. 12, 2020

(51) Int. Cl.
*B60N 2/00* (2006.01)
*B60N 2/02* (2006.01)
*B60N 2/06* (2006.01)

(52) U.S. Cl.
CPC ........... *B60N 2/0244* (2013.01); *B60N 2/002* (2013.01); *B60N 2/06* (2013.01); *B60N 2002/0268* (2013.01); *B60N 2002/0272* (2013.01)

(58) Field of Classification Search
CPC .................. B60N 2/0244; B60N 2/002; B60N 2002/0055; B60R 21/0153
See application file for complete search history.

(56) References Cited

U.S. PATENT DOCUMENTS

| | | | |
|---|---|---|---|
| 6,129,405 A * | 10/2000 | Miyahara | B60N 2/3079 296/65.11 |
| 6,648,393 B1 * | 11/2003 | Milnar | B60N 2/01583 296/65.11 |
| 7,341,302 B2 * | 3/2008 | Slade | B60N 2/062 296/65.01 |
| 7,369,928 B2 | 5/2008 | Wang et al. | |
| 9,333,880 B2 | 5/2016 | Farquhar et al. | |
| 9,545,879 B2 | 1/2017 | Stebbins et al. | |
| 10,099,576 B2 | 10/2018 | Lota | |
| 10,850,693 B1 * | 12/2020 | Pertsel | G06K 9/00832 |
| 2017/0282753 A1 * | 10/2017 | Zouzal | B60N 2/01 |
| 2017/0282754 A1 * | 10/2017 | Zouzal | B60N 2/859 |
| 2017/0313208 A1 * | 11/2017 | Lindsay | B60N 2/0248 |
| 2017/0368964 A1 * | 12/2017 | Kim | B60N 2/0232 |
| 2018/0178681 A1 * | 6/2018 | Yogo | B60N 3/06 |
| 2018/0297489 A1 * | 10/2018 | Szawarski | B60N 2/28 |

(Continued)

FOREIGN PATENT DOCUMENTS

WO  WO-2019012099 A1 *  1/2019  ............. G01S 13/56

*Primary Examiner* — Timothy J Brindley
(74) *Attorney, Agent, or Firm* — Vivacqua Crane PLLC

(57) ABSTRACT

A vehicle seat positioning system includes a seat occupancy sensor that generates a signal indicating the presence or absence of an occupant in each of a first vehicle seat and a second vehicle seat, a seat proximity sensor that generates a seat proximity signal indicating a distance between the first vehicle seat and an occupant of the second vehicle seat, and vehicle seat position controller configured to command the first vehicle seat to move away from the second vehicle seat in response to a signal from the seat occupancy sensor indicating absence of an occupant in the first vehicle seat and the presence of an occupant in the second vehicle seat and a signal from the seat proximity sensor indicating a distance between the first vehicle seat and the occupant of the second vehicle seat is less than a predetermined threshold distance.

10 Claims, 3 Drawing Sheets

(56) References Cited

U.S. PATENT DOCUMENTS

| | | | | |
|---|---|---|---|---|
| 2019/0016235 A1* | 1/2019 | Parida | ................. | B60N 2/0248 |
| 2019/0084446 A1* | 3/2019 | Uno | .................... | B60N 2/0232 |
| 2019/0152346 A1* | 5/2019 | Kim | ....................... | B60Q 9/00 |
| 2019/0299814 A1* | 10/2019 | Yetukuri | ............... | B60N 2/0232 |
| 2019/0344750 A1* | 11/2019 | Takata | ................ | B60R 25/014 |
| 2020/0139853 A1* | 5/2020 | Nawrocki | ............ | B60N 2/1635 |
| 2020/0171979 A1* | 6/2020 | Yetukuri | ................ | B60N 2/002 |
| 2020/0189419 A1* | 6/2020 | Lee | ......................... | B60N 2/06 |
| 2020/0223328 A1* | 7/2020 | Kobayashi | ........... | B60N 2/0244 |
| 2020/0282866 A1* | 9/2020 | Kim | .................... | B60N 2/0252 |

* cited by examiner

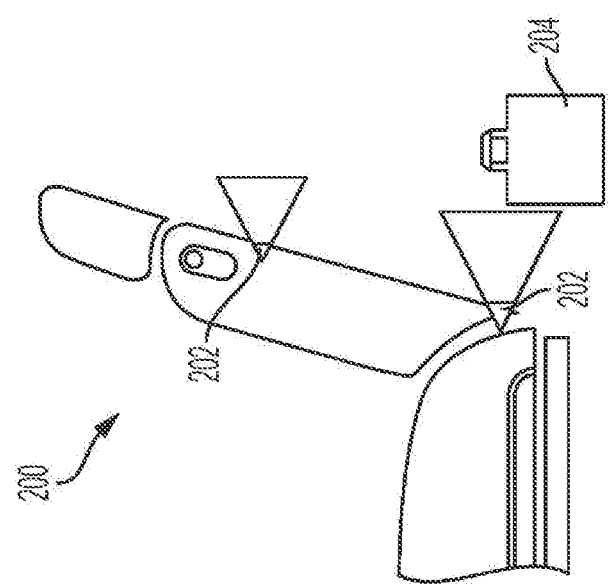
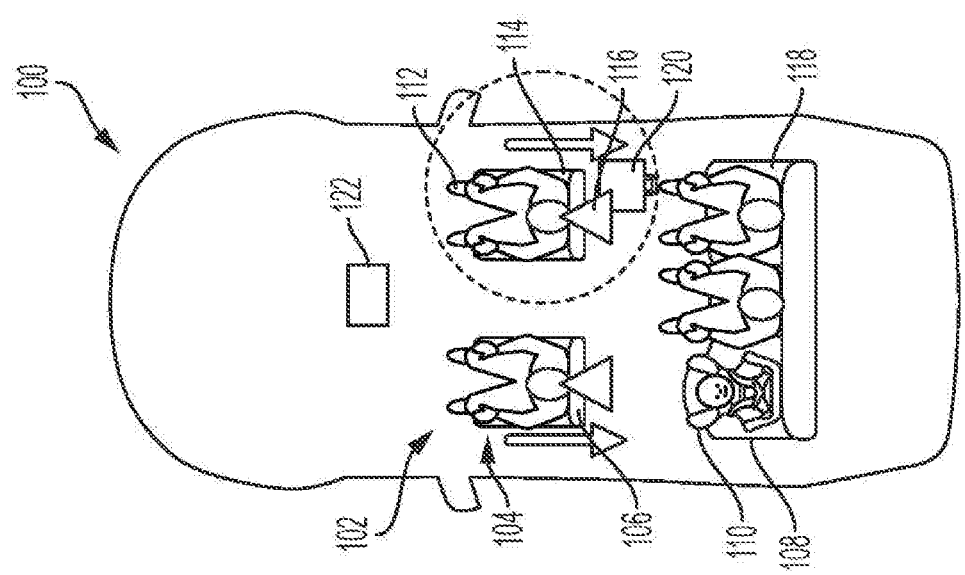
FIG. 2
FIG. 1

VEHICLE SEAT POSITIONING SYSTEM AND METHOD

FIELD

The present disclosure relates to vehicle seat positioning system and method.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Conventional vehicle seats may be position adjustable in a forward and/or rearward direction. For example, an occupant in a forward positioned seat may be able to move their seat in a rearward direction. Moving a forward positioned seat may reduce the amount of space that is available between that seat and a seat that is positioned behind that seat. Vehicle seating systems may include sensors or other devices which limit the ability to move a seat in a rearward direction. However, a need exists to further improve the amount of space between seating in a vehicle.

SUMMARY

In an exemplary aspect, a vehicle seat positioning system includes a seat occupancy sensor that generates a signal indicating the presence or absence of an occupant in each of a first vehicle seat and a second vehicle seat, a seat proximity sensor that generates a seat proximity signal indicating a distance between the first vehicle seat and an occupant of the second vehicle seat, and vehicle seat position controller configured to command the first vehicle seat to move away from the second vehicle seat in response to a signal from the seat occupancy sensor indicating absence of an occupant in the first vehicle seat and the presence of an occupant in the second vehicle seat and a signal from the seat proximity sensor indicating a distance between the first vehicle seat and the occupant of the second vehicle seat is less than a predetermined threshold distance.

In another exemplary aspect, the first vehicle seat is positioned forward of the second vehicle seat in the vehicle.

In another exemplary aspect, the vehicle seat position controller is configured to command the first vehicle seat to move in a forward direction in response to a signal from the seat occupancy sensor indicating an absence of an occupant in the first vehicle seat and the presence of an occupant in the second vehicle seat and a signal from the seat proximity sensor indicating a distance between the first vehicle seat and the one of the object and the occupant of the second vehicle seat is less than a predetermined threshold distance.

In another exemplary aspect, the vehicle seat position controller is configured to command the first vehicle seat to move away from the second vehicle seat until the signal from the seat proximity sensor indicates a distance between the first vehicle seat and the one of the object and the occupant of the second vehicle seat is greater than a predetermined threshold distance.

In another exemplary aspect, the first vehicle seat is positioned laterally within the vehicle relative to the second vehicle seat.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 1 is a schematic, plan view of a vehicle including a plurality of seats and a vehicle seat position control system in accordance with an exemplary embodiment of the present disclosure;

FIG. 2 is a schematic, side view of an exemplary vehicle seat;

DETAILED DESCRIPTION

Figure 3:
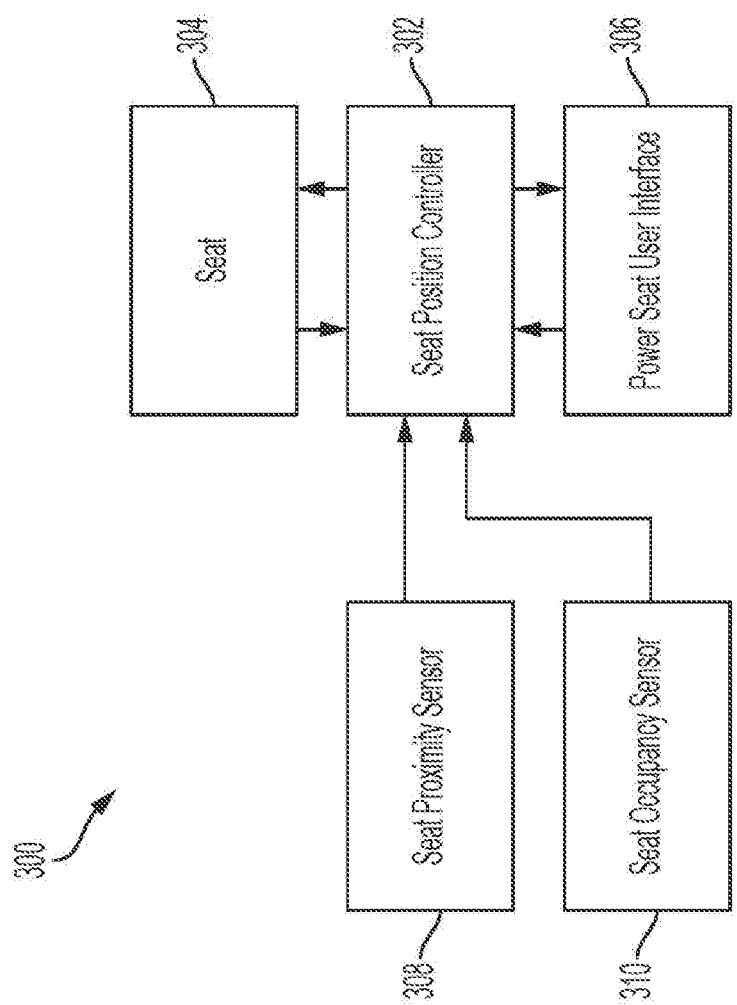
FIG. 3 is a schematic illustration of an exemplary vehicle seat positioning system in accordance with the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring now to the drawings, wherein like reference numbers correspond to like or similar components throughout the several figures, FIG. 1 is a schematic, plan view of a vehicle 100 including a plurality of seats and a vehicle seat position control system in accordance with an exemplary embodiment of the present disclosure. A first occupant 102 occupies a first front seat 104. The first front seat 104 incorporates at least one proximity sensor 106 which detects the proximity of the first front seat 104 to a first rear seat 108 and/or to a second occupant 110 that occupies the first rear seat 108. In the event that the first occupant 102 manipulates a user interface of the first front seat 104 in order to cause the first front seat 104 to move in a rearward direction, the vehicle seat positioning system is responsive to a signal from the proximity sensor 106 that indicates that the first front seat 102 is less than a threshold distance from the first rear seat 108 or the second occupant 110 to limit the motion of the first front seat 104 from continuing to move in the rearward direction. In this manner, the vehicle seat positioning system is able to accommodate the desire of the first occupant 102 to move the first front seat 104 rearwardly while continuing to provide a designated minimum distance between the first front seat 104 and a first rear seat 108 or second occupant 110.

Similarly, FIG. 1 illustrates a third occupant 112 occupying a second front seat 114. The second front seat 114 also incorporates at least one proximity sensor 116 which detects the proximity of the second front seat 114 to a second rear seat 118 and/or to an object 120 positioned between the second front seat 114 and the second rear seat 118. In the event that the third occupant 112 manipulates a user interface of the second front seat 114 in order to cause the second front seat 114 to move in a rearward direction, the vehicle seat positioning system is responsive to a signal from the proximity sensor 116 that indicates that the second front seat 112 is less than a threshold distance from the second rear seat 118 or the object 120 to limit the motion of the second front seat 114 from continuing to move in the rearward direction. In this manner, the vehicle seat positioning system is able to accommodate the desire of the third occupant 112 to move the second front seat 114 rearwardly while continuing to provide a designated minimum distance between the second front seat 114 and a second rear seat 118 or object 120.

Further, the vehicle 100 includes at least one occupant sensor 122 that is adapted to detect the presence of an occupant in one of the first front seat 104 and/or the second front seat 114. In accordance with an exemplary aspect of the present disclosure, the vehicle seat positioning system and method may receive a signal from the at least one occupant sensor 122. If an occupant has moved one of the front seats 104 and/or 114 in a rearward direction and the occupant sensor 122 detects that there is no occupant in the first front seat 104 and/or 114, the vehicle seat positioning system and method may move the respective first front seat 104 and/or second front seat 114 in a forward direction if the respective proximity sensor 106 and/or 116 generates a signal indicating that the distance between the respective seat 104 and/or 114 is less than a threshold distance.

FIG. 2 is a schematic, side view of an exemplary vehicle seat 200 usable with a vehicle seat positioning system and method in accordance with the present disclosure. The vehicle seat includes at least one proximity sensor 202 adapted to generate a proximity signal that is indicative of the proximity of an object 204 that is positioned behind the vehicle seat 200. When an occupant (not shown) of the vehicle seat 200 operates a user interface the vehicle seat 200 may move rearward. When the proximity signal from the proximity sensor 202 indicates that the distance between the vehicle seat 200 and the object 204 is less than a threshold distance, the vehicle seat positioning system and method may limit the rearward movement of the vehicle seat 200.

FIG. 3 is a schematic illustration of an exemplary vehicle seat positioning system 300 in accordance with the present disclosure. The vehicle seat positioning system 300 includes a vehicle seat position controller 302 that is in communication with a vehicle seat 304, a power seat user interface 306, a seat proximity sensor 308, and a seat occupancy sensor 310. The vehicle seat 304 incorporates a vehicle seat position adjustment mechanism (not shown) which is responsive to a vehicle seat position adjustment command from the seat position controller 302 to adjust the position of the vehicle seat 304 within a vehicle. The vehicle seat position controller 302 is responsive to a vehicle seat position adjustment command from the power seat user interface 306 to provide a vehicle seat position adjustment command to the vehicle seat 304. In this manner, an occupant of the vehicle seat may adjust the position of the vehicle seat 304. The vehicle seat position controller 302 is further responsive to a signal from the seat proximity sensor 308 that indicates the proximity of the vehicle seat 304 to an object and/or another occupant located behind the vehicle seat 304 to limit the rearward motion of the vehicle seat 304 when the signal indicates that the distance is less than a threshold distance. Further, in accordance with an exemplary aspect of the present disclosure, the vehicle seat position controller 302 receives a signal from the seat occupancy sensor 310 indicating whether there is an occupant in the vehicle seat 304 and, if the signal from the occupancy sensor 310 indicates that there is no occupant in the vehicle seat 304 and the signal from the seat proximity sensor 308 indicates that the distance between the vehicle seat 304 and an object behind the vehicle seat 304 is less than a threshold distance, then the vehicle seat position controller 302 will command the vehicle seat 304 to move forward. In this manner, an occupant seated in a seat positioned to the rear of a front seat may be provided additional space.

Figure 4:
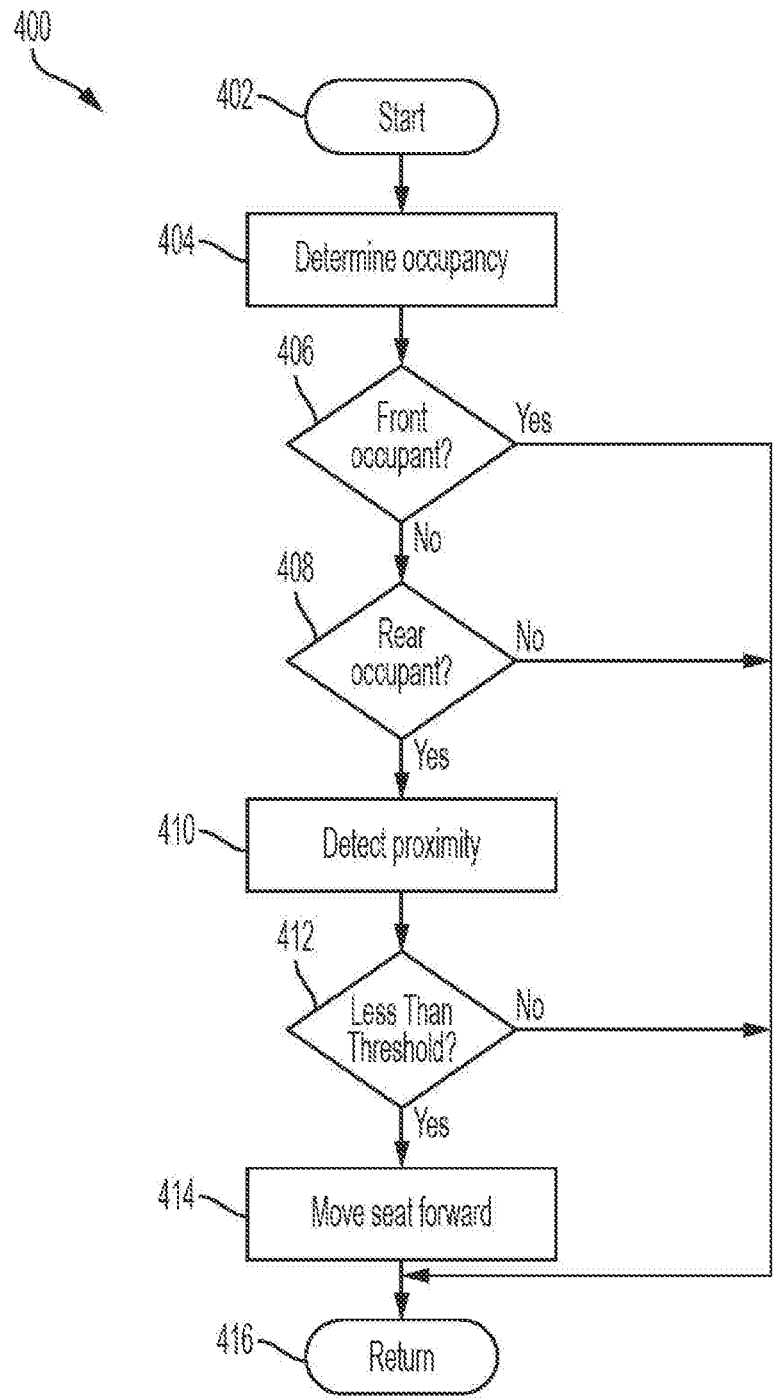
FIG. 4 is an exemplary flowchart of a vehicle seat positioning system and method in accordance with the present disclosure.

FIG. 4 is an exemplary flowchart 400 of a vehicle seat positioning method in accordance with the present disclosure. The method starts at step 402 and continues to step 404. In step 404, the vehicle seat positioning system determines the occupancy of a vehicle using at least one vehicle occupancy sensor and continues to step 406. In step 406, the vehicle seat positioning system determines whether a front seat is occupied. If, in step 406, the vehicle seat positioning system determines that a front seat is occupied, then the method continues to step 408. If, however, in step 406 the vehicle seat positioning system determines that a front seat is not occupied, then the method continues to step 416. In step 408, the vehicle seat positioning system determines whether a rear seat is occupied. If, in step 408, the vehicle seat positioning system determines that a rear seat is occupied, then the method continues to step 410. If, however, in step 408 the vehicle seat positioning system determines that a rear seat is not occupied, then the method continues to step 416. In step 410, the vehicle seat positioning system communicates with at least one proximity sensor that provides a signal indicating the proximity of the front seat to an object or an occupant in the rear seat. The method then continues to step 412 where the vehicle seat positioning system determines whether the distance between the front seat and the object or occupant of the rear seat is less than a predetermined threshold. If, in step 412, vehicle seat positioning system determines that the distance between the front seat and the object or occupant of the rear seat is less than a predetermined threshold, then the method continues to step 414. If, however, in step 412, vehicle seat positioning system determines that the distance between the front seat and the object or occupant of the rear seat is not less than a predetermined threshold, then the method continues to step 416. In step 414, the vehicle seat positioning system moves the front seat forward by a predetermined amount and/or to a position where the distance between the front seat and the object or occupant in the rear seat is greater than the predetermined threshold. In step 416, the method returns to step 402.

It is to be understood that while the detailed description describes a front seat and a rear seat and moving the front seat forward, the vehicle seat positioning system and method includes any configuration of seats within a vehicle. A vehicle seat positioning system and method in accordance with the present disclosure may move a seat away from another seat regardless of the direction. For example, seats which may be arranged laterally with respect to each other may move laterally within the vehicle and remain within the scope of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle seat positioning system in a vehicle, the system comprising:
   a first vehicle seat in the vehicle;
   a second vehicle seat in the vehicle;
   a single seat occupancy sensor that generates a signal indicating the presence or absence of an occupant in each of the first vehicle seat and the second vehicle seat;
   a seat proximity sensor that generates a seat proximity signal indicating a distance between the first vehicle seat and one of an object or an occupant of the second vehicle seat; and
   a vehicle seat position controller configured to command the first vehicle seat to move away from the second vehicle seat in response to a signal from the seat occupancy sensor indicating absence of an occupant in the first vehicle seat and the presence of an occupant in the second vehicle seat and a signal from the seat proximity sensor indicating a distance between the first vehicle seat and the one of the object or the occupant of the second vehicle seat is less than a predetermined threshold distance.

2. The system of claim 1, wherein the first vehicle seat is positioned forward of the second vehicle seat in the vehicle.

3. The system of claim 2, wherein the vehicle seat position controller is configured to command the first vehicle seat to move in a forward direction in response to a signal from the seat occupancy sensor indicating an absence of an occupant in the first vehicle seat and the presence of an occupant in the second vehicle seat and a signal from the seat proximity sensor indicating a distance between the first vehicle seat and the one of the object or the occupant of the second vehicle seat is less than a predetermined threshold distance.

4. The system of claim 1, wherein the vehicle seat position controller is configured to command the first vehicle seat to move away from the second vehicle seat until the signal from the seat proximity sensor indicates a distance between the first vehicle seat and the one of the object or the occupant of the second vehicle seat is greater than a predetermined threshold distance.

5. The system of claim 1, wherein the first vehicle seat is positioned laterally within the vehicle relative to the second vehicle seat.

6. A vehicle seat positioning method for a vehicle that includes a first vehicle seat in the vehicle, a second vehicle seat in the vehicle, a single seat occupancy sensor, a single seat proximity sensor, and a vehicle seat position controller, the method comprising:
   generating a signal indicating the presence or absence of an occupant in each of the first vehicle seat and the second vehicle seat with the single seat occupancy sensor;
   generating a seat proximity signal indicating a distance between the first vehicle seat and one of an object or an occupant of the second vehicle seat with the seat proximity sensor;
   determining whether the signal from the single seat occupancy sensor indicates the absence of an occupant in the first vehicle seat and the presence of an occupant in the second vehicle seat with the vehicle seat position controller;
   determining whether the signal from the seat proximity sensor indicates a distance between the first vehicle seat and the one of the object or the occupant of the second vehicle seat is less than a predetermined threshold distance with the vehicle seat position controller; and
   commanding the first vehicle seat to move away from the second vehicle seat if the signal from the single seat occupancy sensor indicates absence of an occupant in the first vehicle seat and the presence of an occupant in the second vehicle seat and if the signal from the seat proximity sensor indicates that the distance between the first vehicle seat and the one of the object or the occupant of the second vehicle seat is less than a predetermined threshold distance.

7. The method of claim 6, wherein the first vehicle seat is positioned forward of the second vehicle seat in the vehicle.

8. The method of claim 7, wherein commanding the first vehicle seat to move away from the second vehicle seat comprises commanding the first vehicle seat to move in a forward direction.

9. The method of claim 6, further comprising determining whether the signal from the seat proximity sensor indicates a distance between the first vehicle seat and the one of the object or the occupant of the second vehicle seat is greater than the predetermined threshold distance with the vehicle seat position controller, and wherein commanding the first vehicle seat to move away from the second vehicle seat comprises commanding the first vehicle seat to move away from the second vehicle seat until the signal from the seat proximity sensor indicates a distance between the first vehicle seat and the one of the object or the occupant of the second vehicle seat is greater than a predetermined threshold distance.

10. The method of claim 6, wherein the first vehicle seat is positioned laterally within the vehicle relative to the second vehicle seat.

* * * * *